United States Patent [19]
Finch et al.

[11] Patent Number: 5,839,758
[45] Date of Patent: Nov. 24, 1998

[54] ROLL-OVER PROTECTIVE SYSTEM FOR TRACTORS

[75] Inventors: Edwin O. Finch, Philadelphia, Pa.; Fidel A. Martinez; Jaime A. Sandoval, both of Queretaro, Mexico

[73] Assignee: New Holland North America, Inc., New Holland, Pa.

[21] Appl. No.: 811,443

[22] Filed: Mar. 3, 1997

[51] Int. Cl.⁶ ................................................. B60R 21/13
[52] U.S. Cl. ............................................................ 280/756
[58] Field of Search ............................................ 280/756

[56] References Cited

U.S. PATENT DOCUMENTS

| | | | |
|---|---|---|---|
| 3,917,310 | 11/1975 | Mitsuishi | 280/756 |
| 4,666,183 | 5/1987 | Azzarello | 280/756 |
| 4,877,265 | 10/1989 | DeBraal | 280/756 |
| 4,949,991 | 8/1990 | Ludwig | 280/756 |
| 5,042,835 | 8/1991 | Burns | 280/756 |
| 5,129,676 | 7/1992 | Sheehan | 280/756 |
| 5,393,194 | 2/1995 | Smith | 280/756 |
| 5,503,430 | 4/1996 | Miki et al. | 280/756 |

*Primary Examiner*—Kenneth R. Rice
*Attorney, Agent, or Firm*—Larry W. Miller; J. William Stader; Frank A. Seemar

[57] ABSTRACT

A collapsible roll-over protection system is provided with an upper section pivotally connected to a fixed lower section by a four-bar linkage. The linkage permits the upper section to be pivotally rotated rearwardly of the lower section and lowered to an inoperative position adjacent to and immediately behind the lower section. The pivot linkage includes an apertured tab that registers with a locking opening on the lower section to fix the upper section in the inoperative position. The engagement surfaces of the upper and lower sections is slanted with respect to the axis of the legs of the upper and lower sections to facilitate the movement of the upper section between the operative and inoperative positions. A locking pin fixes the structure in both the positions to prevent loose parts whenever the structure is moved between positions.

16 Claims, 6 Drawing Sheets

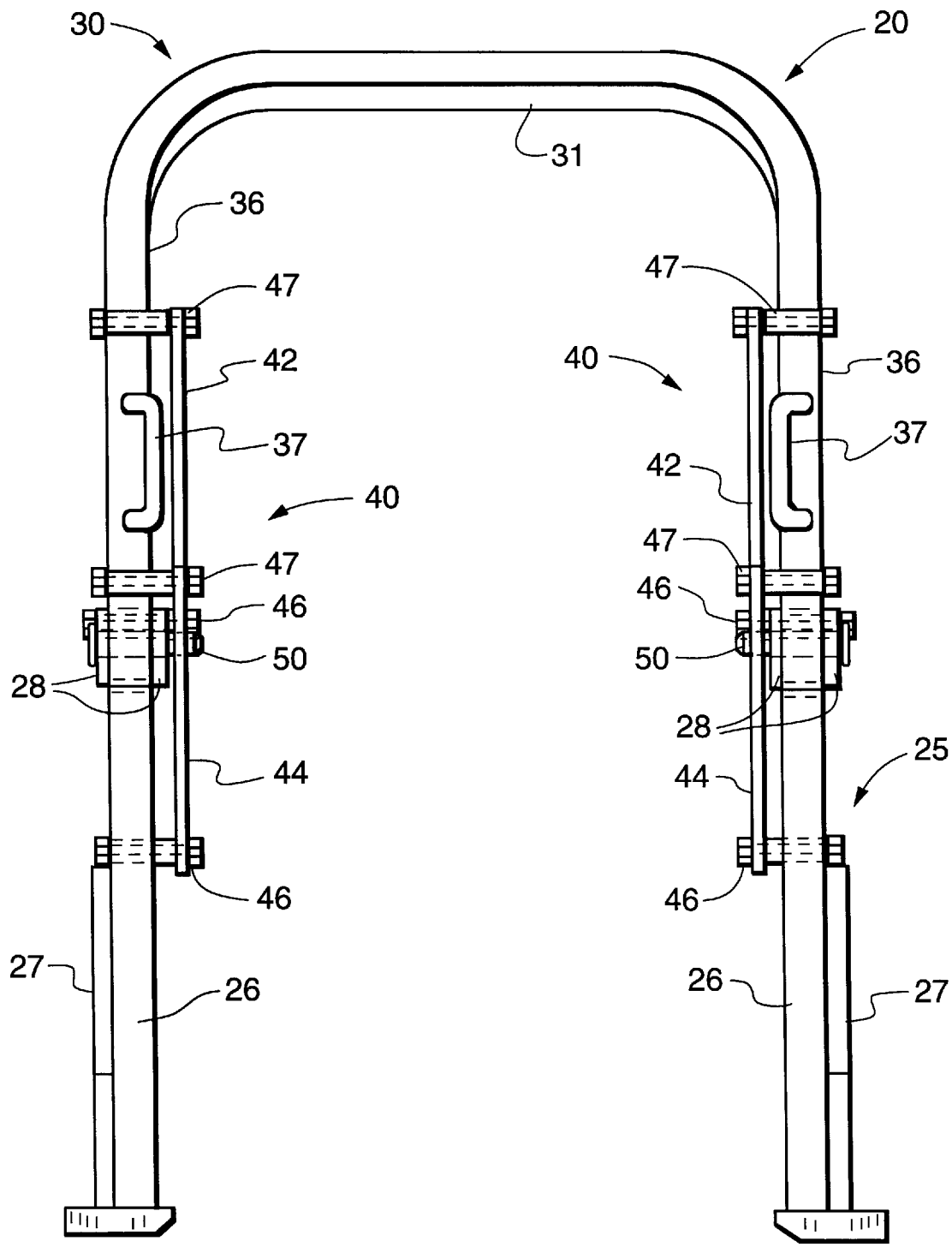

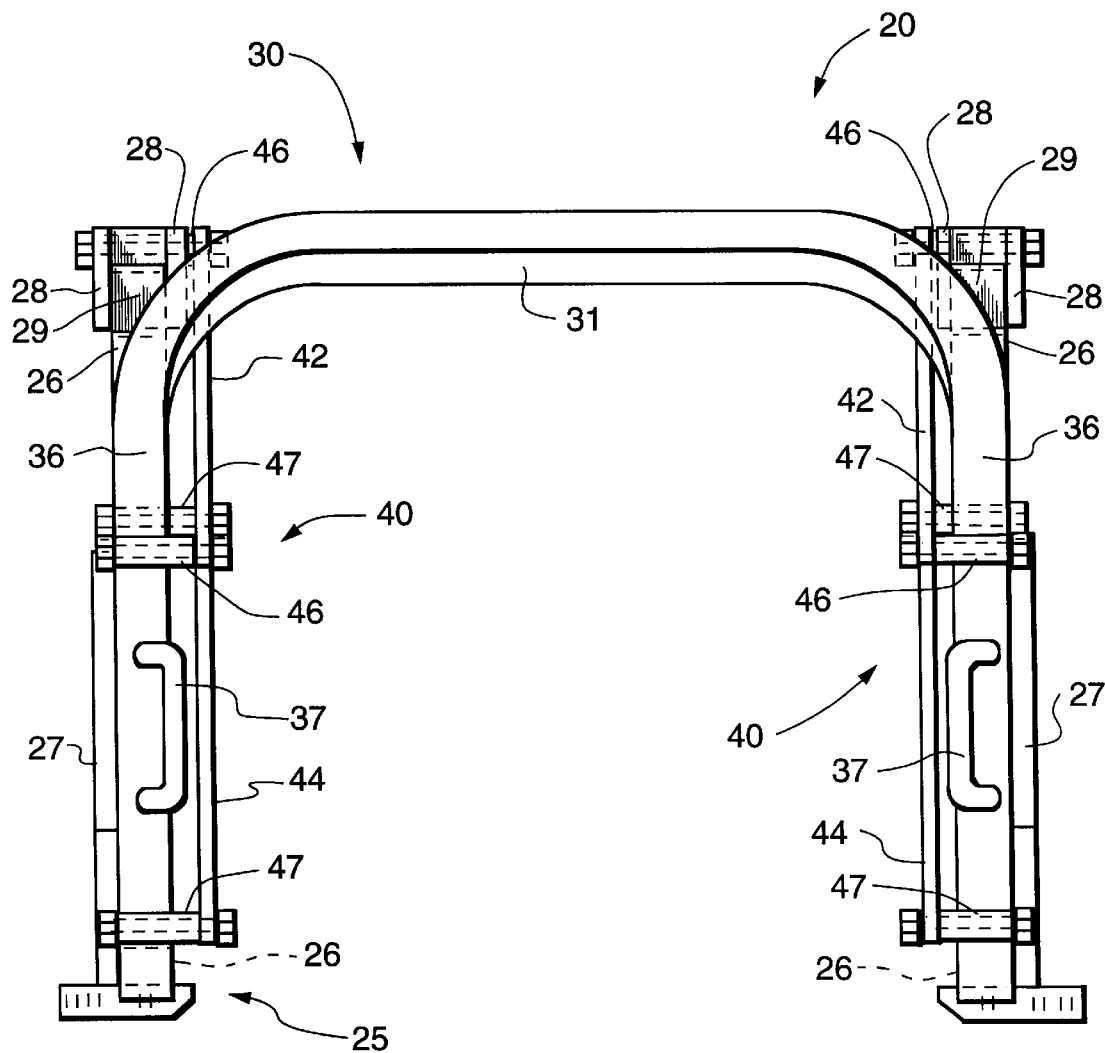

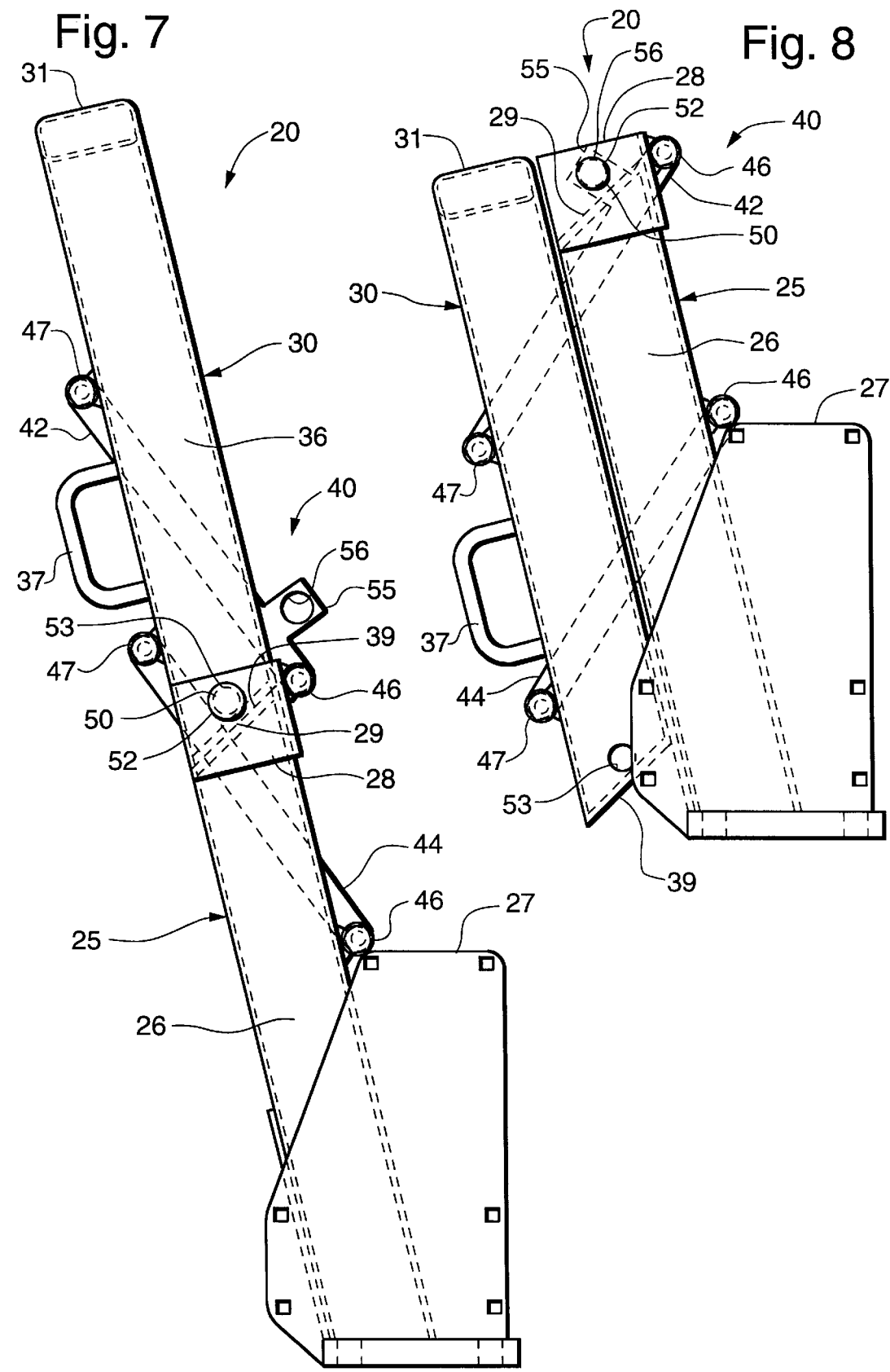

ROLL-OVER PROTECTIVE SYSTEM FOR TRACTORS

BACKGROUND OF THE INVENTION

This invention relates generally to roll-over protection systems for tractors and, more particularly to a collapsible structure that is movable to a lowered position to permit the tractor to be operated beneath low-hanging obstacles.

Conventional roll-over protection (ROPS) systems for tractors provide a structure for supporting the weight of the tractor in the event the tractor rolls over to protect the operator within a safety zone defined by the structure and the forwardmost frame support of the tractor. ROPS systems must project upwardly above the head of the operator in order to be effective; however, this elevated structure can interfere with low-hanging obstacles when the tractor is operated beneath them. A typical application of this problem is in orchards. The low-hanging tree limbs of the fruit-bearing trees can impact the ROPS structure and cause an undesirable loss of fruit therefrom.

To solve this problem, collapsible ROPS structures have been devised to permit the ROPS structure to be lowered to an inoperative position when being operated under conditions in which the ROPS structure would detrimentally interfere with the operations involving the tractor. Unfortunately, a lowered collapsible ROPS structure does not provide a great deal of protection for the operator. A collapsible ROPS mechanism should, therefore, be easily moved between operative and inoperative positions to promote the return of the upper portion of the ROPS structure to the raised operative position.

One configuration of a collapsible ROPS structure can be found in U.S. Pat. No. 5,129,676, issued on Jul. 14, 1992, to Ronald T. Sheehan. This ROPS device is telescopic in operation such that the upper section can be lowered into the hollow legs of the lower section so that the bight portion of the ROPS is lowered at least to the height of the operator's seat. A spring counterbalance mechanism housed within the lower portion offsets at least a portion of the weight of the upper portion to facilitate the movement thereof back to the raised operative position. As a result, this collapsible ROPS structure is difficult and expensive to construct.

The same general operational benefits can be gained from the pivoted ROPS structure found in U.S. Pat. No. 4,949,991, issued on Aug. 21, 1990. In this embodiment of a collapsible ROPS structure, the upper section is pivotally connected to the lower section so that the upper section can be pivotally lowered to a position that lowers the overall height of the ROPS. Depending on the desired location of the pivot, such a ROPS structure could lower the ROPS below the height of the operator's seat. Such a configuration requires a clearance rearwardly of the ROPS structure at least equal to the height of the upper portion being pivotally moved and can be quite awkward to manipulate.

Accordingly, it would be desirable to provide a collapsible ROPS system that is operable in a compact space and that is easy to operate.

SUMMARY OF THE INVENTION

It is an object of this invention to overcome the disadvantages of the prior art by providing a compact collapsible roll-over protection system for a tractor.

It is another object of this invention to provide a collapsible tractor roll-over protection in which the upper section is supported from the lower section by a four-bar linkage.

It is a feature of this invention that the collapsible roll-over protection system is operable within a compact area.

It is an advantage of this invention that the collapsible roll-over protection system requires only minimal clearance rearwardly of the tractor operator seat to be operated.

It is another feature of this invention that the four-bar linkage pivotally supporting the upper section from the lower section can be locked in the lowered position.

It is another feature of this invention that the engagement surfaces of the upper and lower sections of the collapsible roll-over protection system are angled with respect to the legs of the upper and lower sections.

It is still another feature of this invention that the upper section of the collapsible roll-over protection system is stored against the lower section when the collapsible roll-over protection system is moved into an inoperative position.

It is another advantage of this invention that the collapsible roll-over protection system is easily moved between the raised and lowered positions.

It is still another object of this invention to provide a collapsible roll-over protection system that is operable to pass applicable safety standards for roll-over protection systems while permitting the structure to be collapsed into an inoperative position stored behind the operator seat of the tractor.

It is yet another object of this invention to provide a collapsible roll-over protection system that is durable in construction, inexpensive of manufacture, carefree of maintenance, facile in assemblage, and simple and effective in use.

These and other objects, features, and advantages are accomplished according to the instant invention by providing a collapsible roll-over protection system that has an upper section pivotally connected to a fixed lower section by a four-bar linkage. The linkage permits the upper section to be pivotally rotated rearwardly of the lower section and lowered to an inoperative position adjacent to and immediately behind the lower section. The pivot linkage includes an apertured tab that registers with a locking opening on the lower section to fix the upper section in the inoperative position. The engagement surfaces of the upper and lower sections is slanted with respect to the axis of the legs of the upper and lower sections to facilitate the movement of the upper section between the operative and inoperative positions. A locking pin fixes the structure in both the positions to prevent loose parts whenever the structure is moved between positions.

BRIEF DESCRIPTION OF THE DRAWINGS

The advantages of this invention will become apparent upon consideration of the following detailed disclosure of the invention, especially when taken into conjunction with the accompanying drawings wherein:

FIG. 5 is an enlarged rear elevational view of the collapsible roll-over protection system in the raised operative position;

FIG. 6 is an enlarged rear elevational view of the collapsible roll-over protection system in the lowered inoperative position;

FIG. 7 is a side elevational view of the collapsible roll-over protection system in the raised operative position; and FIG. 8 is a side elevational view of the collapsible roll-over protection system in the lowered inoperative position.

DETAILED DESCRIPTION OF THE PREFERRED EMBODIMENT

Figure 1:
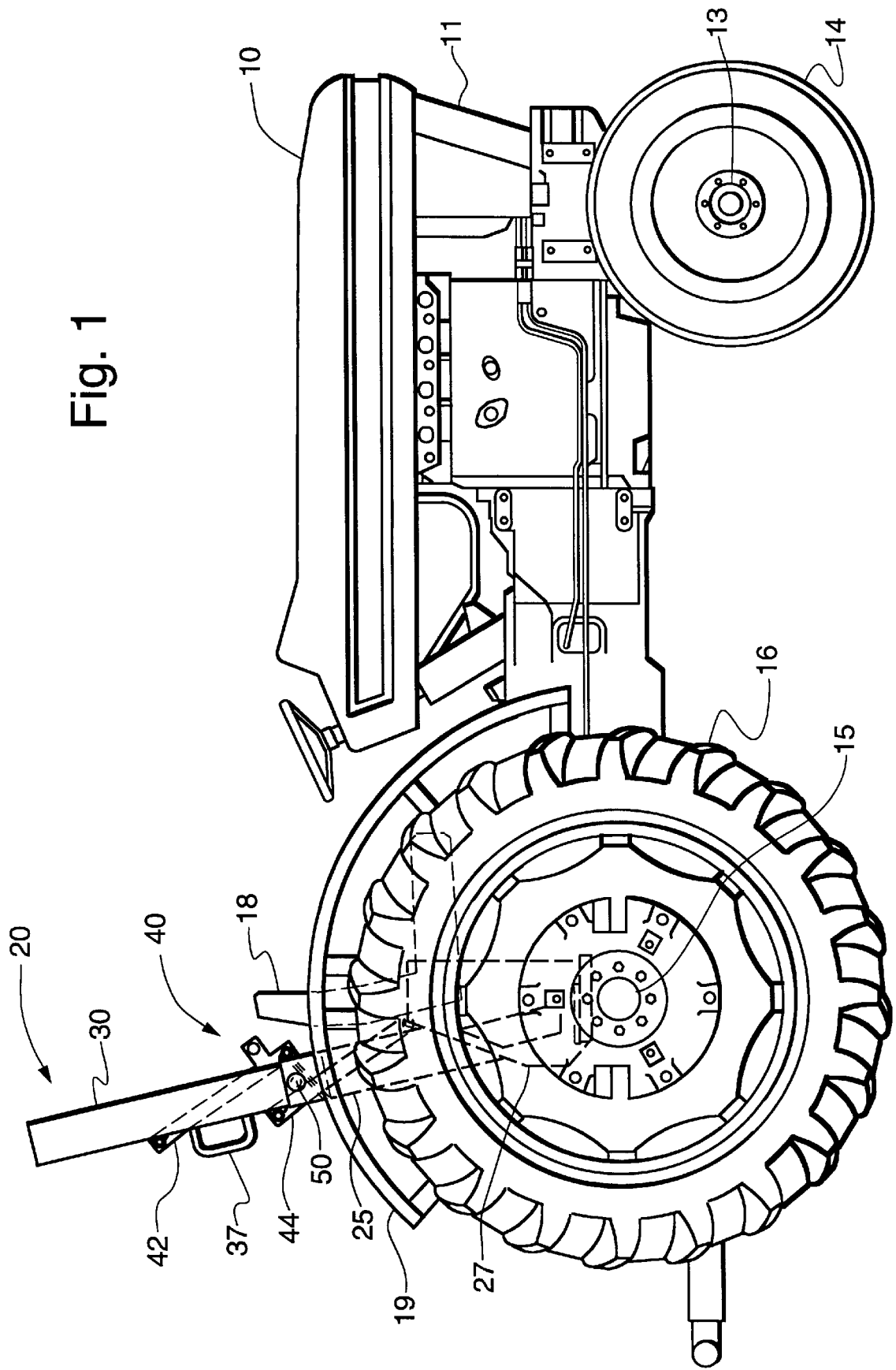
FIG. 1 is a side elevational view of a tractor having a collapsible roll-over protection system incorporating the principles of the instant invention, the upper section being placed in the raised operative position to provide roll-over protection for the operator.
Figure 2:
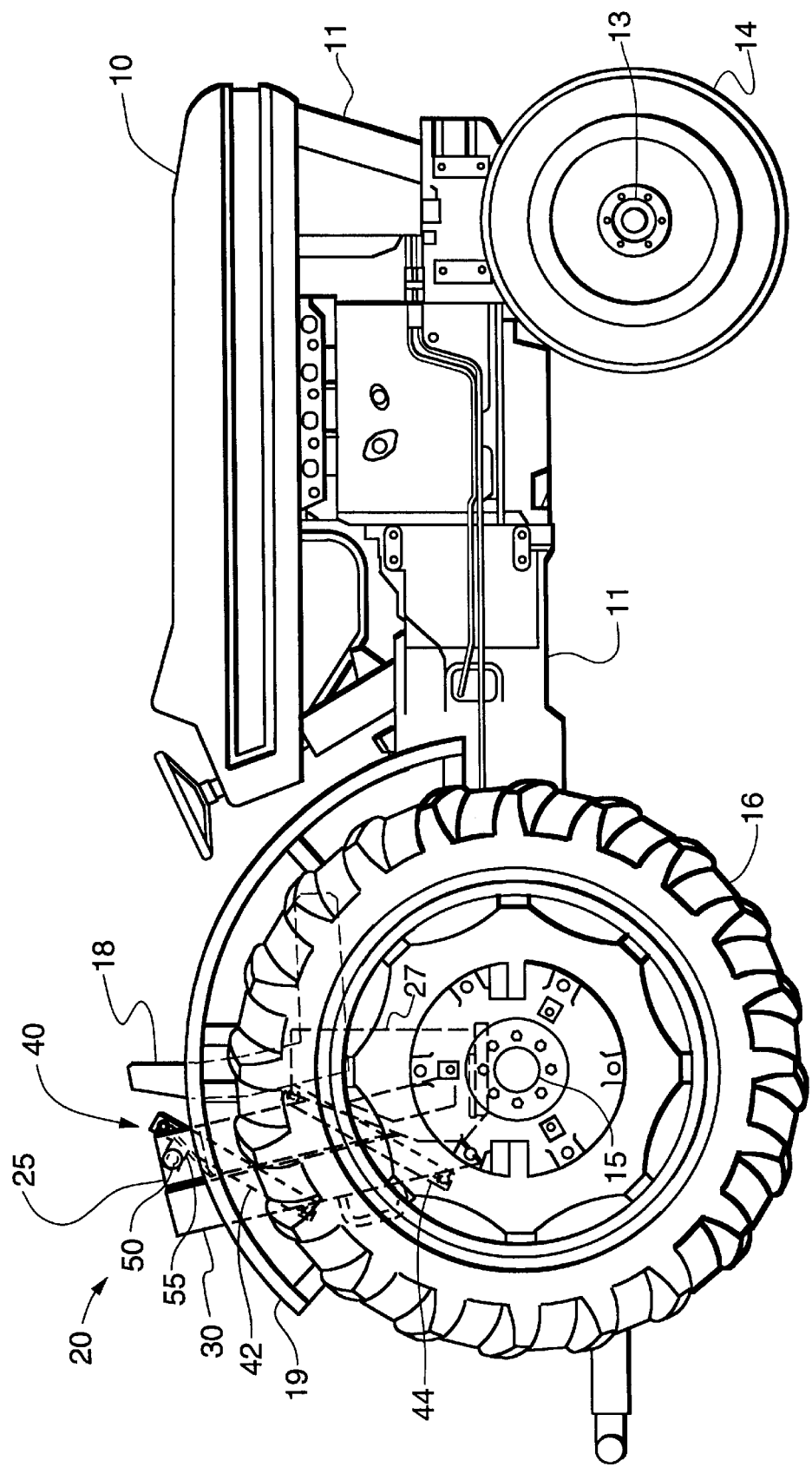
FIG. 2 is a side elevational view of a tractor having the collapsible roll-over protection system shown in FIG. 1 with the upper section being placed in the lowered inoperative position to provide roll-over protection for the operator.

Referring now to FIGS. 1–4, a collapsible roll-over protection system 20 incorporating the principles of the instant invention is shown mounted on a tractor 10. Any left and right references are made as a matter of convenience and are determined by standing at the rear of the tractor facing the forward direction, the normal direction of travel for the tractor 10. The tractor 10 is representatively shown and is generally constructed with a frame 11 supporting a chassis 12 by a front axle 13, having a pair of laterally spaced, steerable wheels 14, and a rear axle 15, having a pair of laterally spaced fixed wheels 16. An operator's seat 18 is supported on the frame 11 generally over the rear axle 15 on which the operator sits to operate the tractor 10.

Figure 3:
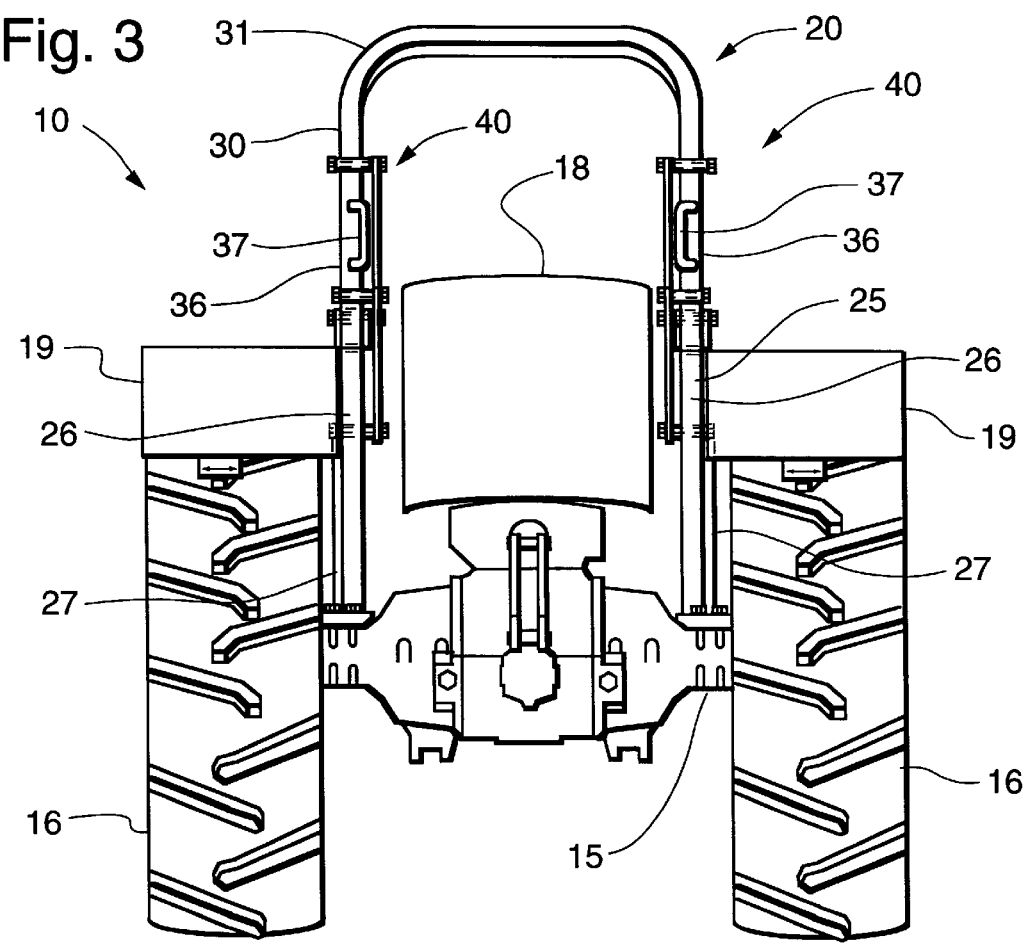
FIG. 3 is a rear elevational view of the tractor and collapsible roll-over protection system shown in FIG. 1.
Figure 4:
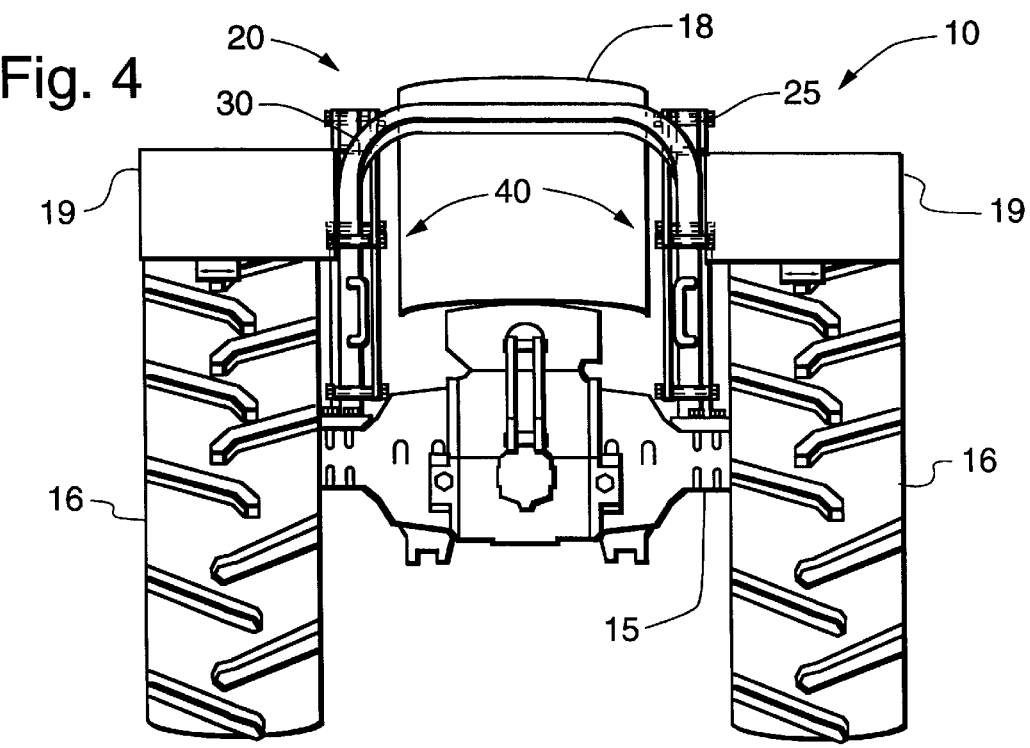
FIG. 4 is a rear elevational view of the tractor and collapsible roll-over protection system shown in FIG. 2.

The collapsible roll-over protection system 20 is mounted on the rear axle 15 rearwardly of the operator's seat 18 and is projectable above the operator's seat 18, when placed in the operative position shown in FIGS. 1 and 3, a sufficient distance that the operator's head (not shown) is located within an envelope having an upper boundary defined by the top of the collapsible roll-over protection system 20 and the forwardmost portion of the tractor frame 11, as is well known in the art. When moved into the inoperative position shown in FIGS. 2 and 4, the collapsible roll-over protection system 20 is lowered to the general height of the tractor chassis 12, which well below the height of the operator's head. Accordingly, the collapsible roll-over protection system 20 should not be placed in the inoperative position any longer than is necessary.

Referring now to FIGS. 5–8, the details of the collapsible roll-over protection system 20 can best be seen. The collapsible roll-over protection system 20 is formed from a fixed lower section 25 and a movable upper section 30. The lower section 25 is formed as a pair of laterally spaced upright tubular members 26. Each member 26 is detachably affixed to a mounting bracket 27 by appropriate conventional fasteners (not shown). Each mounting bracket 27 is in turn detachably mounted to the rear axle 15 for support and to the adjacent fender assembly 19 for stability by appropriate conventional hardware (not shown). As is conventional, the lateral spacing of the tubular members 26 is greater than the transverse width of the operator's seat 18 to provide an adequate safety envelope for the operator should the tractor 10 roll over.

The movable upper section 30 is formed as an inverted "U-shaped" member with the bight portion 31 being the uppermost part thereof. A pair of laterally spaced leg portions 36 extend downwardly from the bight portion 31 in registration with the tubular members 26 of the lower section 25. For reasons that will become apparent from the description below, each of the leg portions is provided with a handle 37 to facilitate the movement of the upper section between the raised and lowered positions. A linkage mechanism 40 pivotally interconnects the upper section 30 and the lower section 25 so that the upper section 30 can be moved vertically relative to the lower section 25. For each corresponding pair of lower section tubular members 26 and registered upper section leg portions 36, the linkage mechanism 40 includes an upper link 42 and a lower link 44 to create a four-bar linkage 40.

Each corresponding pair of upper and lower links 42, 44 are connected to respective pivots 46 on a forward part of the adjacent lower section member 26 and to respective pivots 47 on a rearward portion of the adjacent upper section leg portion 36. As a result, the upper and lower links 42, 44 extend upwardly and rearwardly when the collapsible roll-over protection system 20 is in the operative position. This four-bar linkage mechanism 40 enables the upper section 30 to move from the raised operative position above the lower section 25 to the lowered inoperative position adjacent to and rearwardly of the lower section 25 with a minimum of rearward displacement of the upper section 30.

The top surface 29 of each of the lower section members 26 is slanted to face rearwardly at an angle substantially perpendicularly to the orientation of the upper and lower links 42, 44 when in the raised operative position. Similarly, the bottom surface 39 of each of the upper section leg portions 36 are slanted to face forwardly to register with the top surfaces 29 of the tubular members 26. Accordingly, the top and bottom surfaces 29, 39 form registerable engagement surfaces that facilitate the movement of the upper section into and out of the raised operative position. The lower section members 26 are also provided with guide members 28 positioned on opposite sides of the corresponding top surface 29 and projecting upwardly therefrom. The guide members 28 are spaced sufficiently to receive the corresponding upper section leg portions 36 and operate to guide the leg portions 36 into alignment with the lower section member 26.

To lock the collapsible roll-over protection system in either the raised operative position or the lowered inoperative position, a locking pin 50 is provided for each lower section member 26. Each of the guide members 28 are formed with a transversely extending opening 52, aligned with the other corresponding opening 52, through which a locking pin 50 can be received. Corresponding transverse openings 53 are formed in the lower portion of the upper section leg portions 36 immediately above the engagement surface 39. Description below of one of the locking pins 50 is intended to apply to both members 26. When the upper section 30 is placed in the raised operative position, as shown in FIG. 7, the transverse openings 52, 53 are aligned, allowing the locking pin 50, inserted through the aligned openings 52, 53, to lock the upper section 30 in the raised operative position. A cross pin (not shown) or other suitable fastener engageable with the locking pin 50 retains the locking pin 50 in an engaged position.

Each of the upper links 42 is formed with a perpendicularly extending locking tab 55 having a transversely oriented opening 56 extending therethrough. The openings 56 in the upper links 42 are aligned with the transverse openings 52 in the guide members 28 when the upper section is placed into the fully lowered inoperative position, as shown in FIG. 8. Consequently, the insertion of the locking pin 50 through the aligned openings 52, 56 locks the upper section 30 in the lowered inoperative position. One skilled in the art will recognize that the use of the same locking pin 50 for locking the upper section 30 in both the raised and lowered positions prevents any loose parts from becoming lost due to the conversion of the collapsible roll-over protection system between the raised and lowered positions. One skilled in the art will also recognize that the collapsible roll-over protection system moves between the raised and lowered positions in a compact configuration within a minimum amount of space.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a frame supported on a rear axle; an operator's seat positioned proximate to said rear axle; and a roll-over protection apparatus mounted on said rear axle rearwardly of said operator's seat, an improved roll-over protection apparatus comprising:

a fixed lower section attached to said rear axle;

a movable upper section alignable with said lower section and movable relative thereto between a raised operative position and a lowered inoperative position; and a four-bar linkage mechanism connecting said upper section to said lower section to permit said upper section to be pivotally moved relative to said lower section.

2. The tractor of claim 1 wherein said four-bar linkage mechanism comprises:

a pair of laterally spaced top links pivotally interconnecting said upper and lower sections; and a pair of laterally spaced bottom links pivotally interconnecting said upper and lower sections, said bottom links being parallel to said top links.

3. The tractor of claim 2 wherein said roll-over protection apparatus further comprises:

a pin interengaging said upper and said lower sections when said upper section is in said raised operative position.

4. The tractor of claim 3 wherein at least one of said top links includes an aperture, said pin being engageable with said at least one top link through said aperture and with said lower section to lock said upper section in said lowered inoperative position.

5. The tractor of claim 3 wherein both said upper section and said lower section have registerable engagement surfaces angled substantially perpendicularly to said top and bottom links when said upper section is in said raised operative position.

6. The tractor of claim 5 wherein each of said top and bottom links is pivotally connected to a forward portion of said lower section and to a rearward portion of said upper portion, wherein said top and bottom links extend upwardly and rearwardly when said upper section is in said raised operative position.

7. The tractor of claim 6 wherein said lower section includes a pair of generally upright, laterally spaced members connected to a corresponding pair of laterally spaced mounting brackets, each said mounting bracket being detachably affixed to said rear axle.

8. The tractor of claim 7 wherein said upper section includes a handle to facilitate the movement of said upper section between said raised operative position and said lowered inoperative position.

9. A roll-over protection system for use on vehicles, comprising:

a fixed lower section attached to said vehicle;

a movable upper section alignable with said lower section and movable relative thereto between a raised operative position and a lowered inoperative position;

a pair of laterally spaced top links pivotally interconnecting said upper and lower sections; and a pair of laterally spaced bottom links pivotally interconnecting said upper and lower sections, said bottom links being parallel to said top links, said top and bottom links permitting said upper section to be pivotally moved relative to said lower section.

10. The roll-over protection system of claim 9 wherein both said upper section and said lower section have registerable engagement surfaces angled substantially perpendicularly to said top and bottom links when said upper section is in said raised operative position.

11. The roll-over protection system of claim 10 wherein each of said top and bottom links is pivotally connected to a forward portion of said lower section and to a rearward portion of said upper portion, wherein said top and bottom links extend upwardly and rearwardly when said upper section is in said raised operative position.

12. The roll-over protection system of claim 11 further comprising:

a pin interengaging said upper and said lower sections when said upper section is in said raised operative position to lock said upper section into said raised operative position.

13. The roll-over protection system of claim 12 wherein at least one of said top links includes an aperture, said pin being engageable with said at least one top link through said aperture and with said lower section to lock said upper section in said lowered inoperative position.

14. The roll-over protection system of claim 13 wherein said lower section includes a pair of generally upright, laterally spaced members connected to a corresponding pair of laterally spaced mounting brackets, each said mounting bracket being detachably affixed to said rear axle, said upper section being formed in an inverted U-shaped configuration with generally vertically oriented legs alignable with said lower section members.

15. The roll-over protection system of claim 14 wherein each said lower section member has said engagement surface as an uppermost portion thereof, each said upper section leg having said engagement surface as a lowermost portion thereof.

16. The roll-over protection system of claim 15 wherein each said lower section member is provided with guide means for guiding the corresponding said upper section legs into alignment with said lower section members when said upper section is being moved from said lowered inoperative position to said raised operative position.

* * * * *